US012118917B2

(12) United States Patent
Li

(10) Patent No.: US 12,118,917 B2
(45) Date of Patent: Oct. 15, 2024

(54) DRIVING SYSTEM AND DRIVING METHOD OF DISPLAY PANEL

(71) Applicant: TCL China Star Optoelectronics Technology Co., Ltd., Guangdong (CN)

(72) Inventor: Wenfang Li, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,396

(22) PCT Filed: Jul. 26, 2021

(86) PCT No.: PCT/CN2021/108459
§ 371 (c)(1),
(2) Date: Sep. 30, 2021

(87) PCT Pub. No.: WO2023/284004
PCT Pub. Date: Jan. 19, 2023

(65) Prior Publication Data

US 2024/0046850 A1 Feb. 8, 2024

(30) Foreign Application Priority Data

Jul. 15, 2021 (CN) ......................... 202110800701.3

(51) Int. Cl.
*G09G 3/20* (2006.01)
*G09G 3/36* (2006.01)

(52) U.S. Cl.
CPC ......... *G09G 3/2096* (2013.01); *G09G 3/2007* (2013.01); *G09G 3/3611* (2013.01);
(Continued)

(58) Field of Classification Search
CPC .. G09G 3/2096; G09G 3/2007; G09G 3/3611; G09G 2310/027;
(Continued)

(56) References Cited

U.S. PATENT DOCUMENTS

2001/0043187 A1* 11/2001 Ikeda .................. G09G 3/3688 345/98
2005/0156836 A1* 7/2005 Yoneyama ............... G09G 3/32 345/76

(Continued)

FOREIGN PATENT DOCUMENTS

CN 1605905 4/2005
CN 1873755 12/2006

(Continued)

*Primary Examiner* — Amare Mengistu
*Assistant Examiner* — Gloryvid Figueroa-Gibson

(57) ABSTRACT

A driving system and a display panel are provided. The driving system includes a timing controller and a driving chip. The driving chip receives the video signal and processes the video signal to output a characteristic current or a regular current to the display panel. The driving chip outputs the characteristic current to the display panel when the driving chip receives the characteristic video signal and to output the regular current to the display panel when the driving chip receives the regular video signal, and the characteristic current is smaller than regular current. The driving system of the display panel according to the present disclosure could alleviate the capacitor coupling effect caused by the large voltage jump introduced by the huge gray value difference when the display panel in a frame transition and thus improve the horizontal crosstalk of the display panel.

19 Claims, 3 Drawing Sheets

(52) U.S. Cl.
CPC ................. *G09G 2310/027* (2013.01); *G09G 2320/0209* (2013.01); *G09G 2320/103* (2013.01); *G09G 2330/021* (2013.01); *G09G 2340/00* (2013.01)

(58) Field of Classification Search
CPC ..... G09G 2320/0209; G09G 2320/103; G09G 2330/021; G09G 2340/00
USPC .......................................................... 345/691
See application file for complete search history.

(56) References Cited

U.S. PATENT DOCUMENTS

| | | | | |
|---|---|---|---|---|
| 2007/0229442 | A1* | 10/2007 | Yi | G09G 3/3688 345/100 |
| 2013/0094754 | A1* | 4/2013 | Lee | G09G 5/003 382/167 |
| 2018/0196294 | A1* | 7/2018 | Ishida | G02F 1/136286 |
| 2019/0206330 | A1* | 7/2019 | Kim | G09G 3/3283 |
| 2022/0270549 | A1* | 8/2022 | Xuan | G09G 3/3258 |

FOREIGN PATENT DOCUMENTS

| | | |
|---|---|---|
| CN | 102024438 | 4/2011 |
| CN | 105741731 | 7/2016 |
| CN | 205959592 | 2/2017 |
| CN | 109147688 | 1/2019 |
| CN | 111540326 | 8/2020 |
| CN | 112542122 | 3/2021 |
| EP | 1826743 | 8/2007 |
| KR | 10-2015-0051364 | 5/2015 |
| TW | 509844 | 11/2002 |
| TW | 200638324 | 11/2006 |
| TW | 201013269 | 4/2010 |
| TW | 201220942 | 5/2012 |
| TW | 201306462 | 2/2013 |

* cited by examiner

DRIVING SYSTEM AND DRIVING METHOD OF DISPLAY PANEL

RELATED APPLICATIONS

This application is a National Phase of PCT Patent Application No. PCT/CN2021/108459 having International filing date of Jul. 26, 2021, which claims the benefit of priority of Chinese Patent Application No. 202110800701.3 filed on Jul. 15, 2021. The contents of the above applications are all incorporated by reference as if fully set forth herein in their entirety.

FIELD AND BACKGROUND OF THE INVENTION

The present disclosure relates to a display technology, and more particularly, to a driving system and a driving method of a display panel.

As the progress of the LCD display technology, the demands for high resolutions, wide view angles, high response speed, high aperture rate LCDs become higher and higher. In addition, due to the shirking size of the pixels, the pitches between the lines on the TFT substrate become shorter. This means that the coupling effect between different signal lines becomes severe. Therefore, when one signal has a voltage jump, the stabilities of surrounding signals might be influenced.

In the conventional display panel, when the gray value difference of the display screen between the adjacent frames, the data voltage needs to have a voltage jump in the transition. However, a huge voltage jump may introduce the capacitor coupling of the common electrode. This changes the voltage level of the common electrode and causes horizontal crosstalk in the display screen.

SUMMARY OF THE INVENTION

One objective of an embodiment of the present disclosure is to provide a driving system and a driving method of a display panel, which could reduce the capacitor coupling effect of the common electrode and alleviate the horizontal crosstalk.

According to an embodiment of the present disclosure, a driving system of a display panel is disclosed. The driving system comprises: a timing controller, connected to the display panel, configured to receive a V-by-one (VBO) information, analyze the VBO information, and output a corresponding video signal; wherein the video signal is a characteristic video signal or a regular video signal, and a a display screen switching gray value difference corresponding to the characteristic video signal is greater than a display screen switching gray value difference corresponding to the regular video signal; and a driving chip, connected to the timing controller and the display panel, configured to receive the video signal and process the video signal to output a characteristic current or a regular current to the display panel; wherein the driving chip is configured to output the characteristic current to the display panel when the driving chip receives the characteristic video signal and to output the regular current to the display panel when the driving chip receives the regular video signal, and the characteristic current is smaller than regular current.

Optionally, the driving chip comprises: a data processing module, configured to receive the video signal and process the video signal to output a corresponding analog signal; a selecting module, configured to output a selection result according to the video signal; and a current driving module, configured to receive the analog signal and process the analog signal according to the selection result to output the characteristic current or the regular current to the display panel.

Optionally, the data processing module comprises: a register, configured to receive the video signal and temporarily store the video signal; a latch, configured to receive the video signal temporarily stored in the register and latch the video signal; a level shifter, configured to receive the video signal latched by the latch and process the video signal to output a digital signal; and a digital-to-analog converter, configured to receive the digital signal to output an analog signal.

Optionally, the selecting module comprises: a switch unit, comprising a first switch and a second switch; and a control unit, configured to turn on the first switch according to the characteristic video signal to output a characteristic current selection result and to turn on the second switch according to the regular video signal to output a regular current selection result.

Optionally, the current driving module comprises: a first current source, configured to receive the analog signal and process the analog signal to output the characteristic current according to the characteristic current selection result; a second current source, configured to receive the analog signal and process the analog signal to output the regular current according to the regular current selection result; and an amplifying unit, configured to amplify the characteristic current and the regular current and output an amplified characteristic current and an amplified regular current to the display panel. The first switch is connected to the data processing module and the first current source and the second switch is connected to the data processing module and the second current source.

Optionally, a driving capability of the first current source is smaller than a driving capability of the second current source.

Optionally, when the characteristic current is outputted to the display panel, the data voltage of the display panel is switched within 100 ns-300 nm.

Optionally, when the characteristic current is outputted to the display panel, the data voltage of the display panel is switched within 40 ns-60 nm.

Optionally, the characteristic video signal is a video signal outputted in a transition of an $N^{th}$ frame and an $(N+1)^{th}$ frame when a gray value difference between the $N^{th}$ frame and the $(N+1)^{th}$ frame is greater than or equal to 32, and N is an integer greater than or equal to 1.

Optionally, the characteristic video signal is a video signal outputted in the transition of the $N^{th}$ frame and the $(N+1)^{th}$ frame when the $N^{th}$ frame has a gray value of 32 and the $(N+1)^{th}$ frame has a gray value of 64.

Optionally, the characteristic video signal is a video signal outputted in the transition of the $N^{th}$ frame and the $(N+1)^{th}$ frame when the $N^{th}$ frame has a gray value of 64 and the $(N+1)^{th}$ frame has a gray value of 128.

Optionally, the characteristic video signal is a video signal outputted in the transition of the $N^{th}$ frame and the $(N+1)^{th}$ frame when the $N^{th}$ frame has a gray value of 64 and the $(N+1)^{th}$ frame has a gray value of 255.

Optionally, the characteristic video signal is a video signal outputted in the transition of the $N^{th}$ frame and the $(N+1)^{th}$ frame when the $N^{th}$ frame has a gray value of 128 and the $(N+1)^{th}$ frame has a gray value of 255.

Optionally, the timing controller is further configured to determine whether the display screen switching gray value difference is greater than or equal to 32.

According to an embodiment of the present disclosure, a driving method of a display panel is disclosed. The driving method comprises: receiving a V-by-one (VBO) information, analyzing the VBO information, and outputting a corresponding video signal; wherein the video signal is a characteristic video signal or a regular video signal, and a display screen switching gray value difference corresponding to the characteristic video signal is greater than a display screen switching gray value difference corresponding to the regular video signal; and receiving the video signal and processing the video signal to output a characteristic current or a regular current to the display panel; wherein the characteristic current is outputted to the display panel when the driving chip receives the characteristic video signal and the regular current is outputted to the display panel when the driving chip receives the regular video signal, and the characteristic current is smaller than regular current.

Optionally, the step of receiving the V-by-one VBO information, analyzing the VBO information, and outputting the corresponding video signal comprises: determining whether the display screen switching gray value difference is greater than or equal to 32; and outputting the characteristic video signal if the display screen switching gray value difference is greater than or equal to 32.

Optionally, the step of receiving the V-by-one VBO information, analyzing the VBO information, and outputting the corresponding video signal comprises: determining whether the display screen switching gray value difference is greater than or equal to 32; and outputting the regular video signal if the display screen switching gray value difference is smaller than 32.

Optionally, the step of receiving the video signal and processing the video signal to output a characteristic current or a regular current to the display panel comprises: receiving the video signal, outputting a selection result according to the video signal, and processing the video signal to output a corresponding analog signal; receiving the analog signal and processing the analog signal according to the selection result to output the characteristic current or the regular current.

Optionally, the driving method of claim 18, further comprising a following step before the step of outputting the characteristic current or the regular current: amplifying the characteristic current or the regular current.

Optionally, the step of receiving the video signal, outputting a selection result according to the video signal, and processing the video signal to output the corresponding analog signal comprises: receiving the characteristic video signal, outputting the characteristic current selection result according to the characteristic video signal, and processing the characteristic video signal to output the corresponding analog signal; or receiving the regular video signal, outputting the regular current selection result according to the characteristic video signal, and processing the regular video signal to output the corresponding analog signal.

The present disclosure discloses a driving system and a driving method of a display panel. The driving system has two different driving currents. When the display screen is in a transition between different gray value differences, different driving currents are outputted such that the data voltages could be switched in different rates. When the gray value difference in the frame transition is greater, the driving chip receives a characteristic video signal. When the gray value difference in the frame transition is smaller, the driving chip receives a regular video signal. When the driving chip receives the characteristic video signal, the driving chip outputs the characteristic current to the display panel such that the data voltage could be switched in a slower rate when the display panel is in a frame transition. The characteristic current could make the voltage of the data voltage raises slowly and thus the impact on the voltage level of the capacitor is comparatively low. In this way, the voltage level of the common electrode does not shift. Accordingly, the driving system of the display panel according to the present disclosure could alleviate the capacitor coupling effect caused by the large voltage jump introduced by the huge gray value difference when the display panel in a frame transition and thus improve the horizontal crosstalk of the display panel.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

Figure 1:
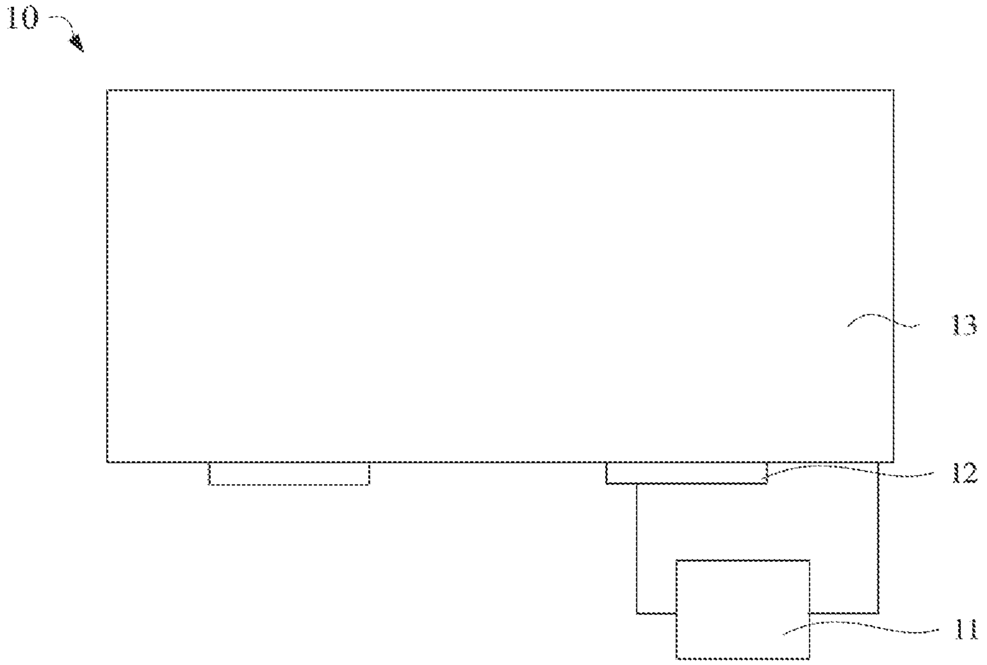
FIG. 1 is a diagram of a driving system of a display panel and the display panel according to an embodiment of the present disclosure.
Figure 2:
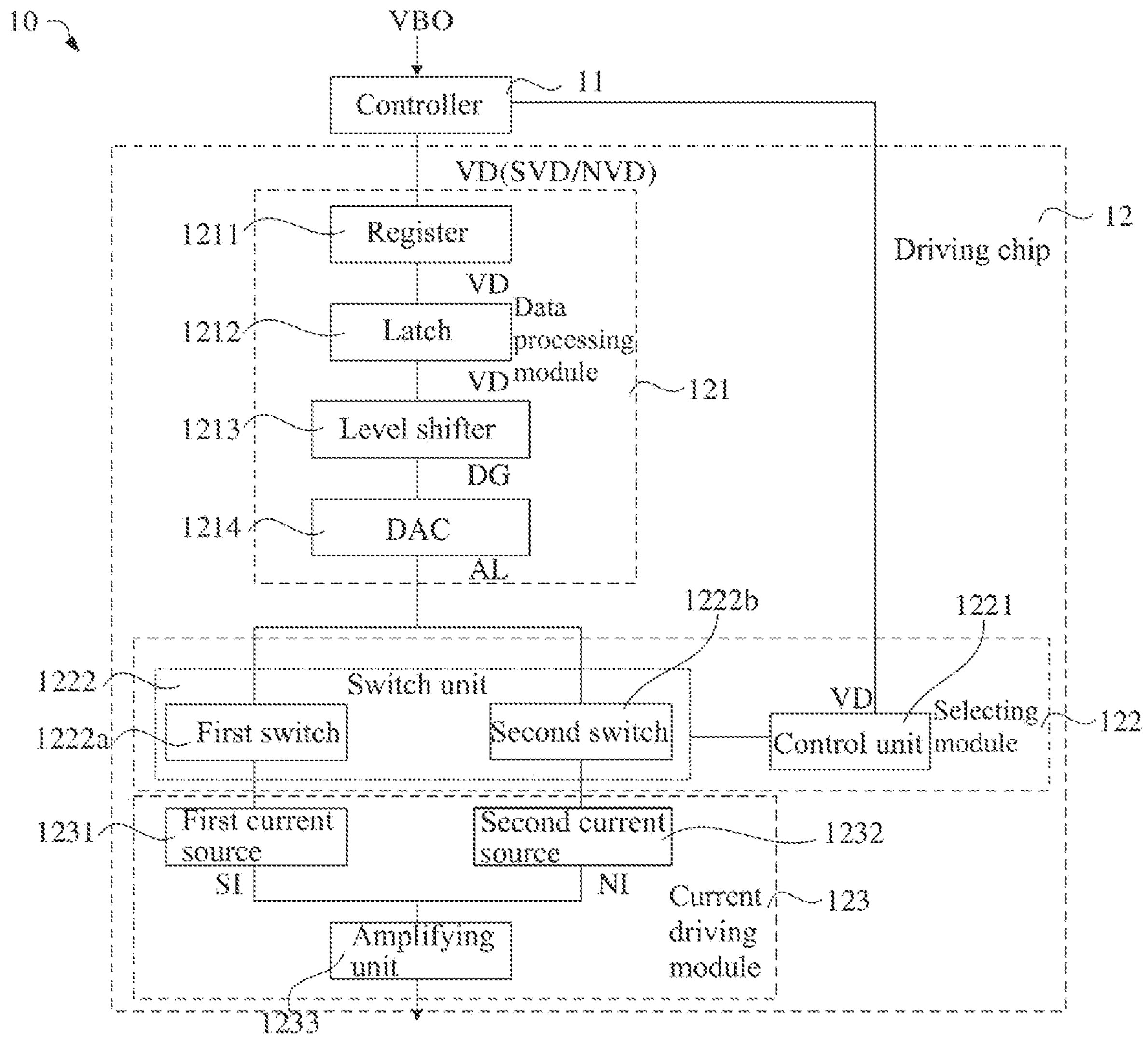
FIG. 2 is a functional block diagram of a driving system of a display panel according to an embodiment of the present disclosure.

Please refer to FIG. 1 and FIG. 2. FIG. 1 is a diagram of a driving system of a display panel and the display panel according to an embodiment of the present disclosure. FIG. 2 is a functional block diagram of a driving system of a display panel according to an embodiment of the present disclosure. The driving system 10 of the display panel comprises a timing controller 11 and a driving chip 12.

The timing controller 11 is connected to the display panel 13. The timing controller 11 is configured to receive a V-by-one™ (hereinafter, VBO) information, analyze the VBO information, and output a corresponding video signal VD. Here, the video signal VD is a characteristic video signal SVD or a regular video signal NVD. The display screen switching gray value difference corresponding to the characteristic video signal SVD is greater than the display screen switching gray value difference corresponding to the regular video signal NVD.

The driving chip 12 is connected to the timing controller 11 and the display panel 13. The driving chip 12 is configured to receive the video signal VD and process the video signal VD to output a characteristic current SI or a regular current NI to the display panel. The driving chip 12 is configured to output the characteristic current SI to the display panel 13 when the driving chip 12 receives the characteristic video signal SVD and to output the regular current NI to the display panel 13 when the driving chip 12 receives the regular video signal NVD. The characteristic current SI is smaller than regular current NI.

In order to realize higher resolution, the pixel size needs to be shrunk. In this way, the pitches between signal lines on the TFT substrate become shorter and thus the coupling effect between different signal lines becomes severe. When a signal has a voltage jump, the stabilities of surrounding signals might be influenced. For example, when the display screen is in a transition of frames, if the gray value difference between the adjacent frames is huge, the voltage level of the data lines enormously changes. This means that the data voltage needs to have a huge voltage jump for switching the frames. At this time, the driving current for controlling the data lines charges the capacitor between the data line and the common electrode. The voltage jump introduces the capacitor coupling effect, changes the voltage level of the common electrode and causes horizontal crosstalk in the display screen.

Figure 3:
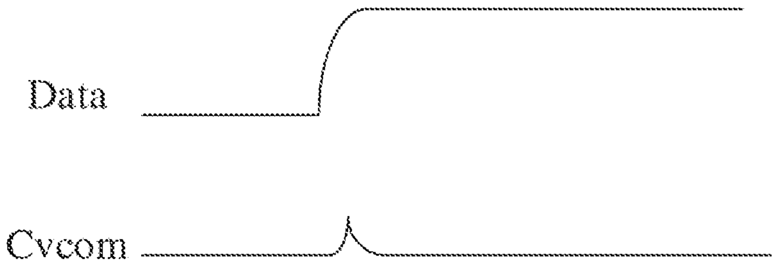
FIG. 3 is a diagram showing voltage variances of data lines and capacitors driven by a characteristic current according to an embodiment of the present disclosure.

The present disclosure has two different driving currents in the driving system 10 of the display panel. Based on the gray value difference between different frames, different driving currents are outputted to the display panel 13 such that the data voltages of the display panel 13 could be switched in different rates. When the gray value difference between the frames is greater, the driving chip 12 receives the characteristic video signal SVD. When the driving chip 12 receives the characteristic video signal SVD, the driving chip 12 outputs the characteristic current SI to the display panel 13 such that the data voltages could be switched in a slower rate when the display panel 13 is in a transition of frames. Please refer to FIG. 3. FIG. 3 is a diagram showing voltage variances of data lines and capacitors driven by a characteristic current according to an embodiment of the present disclosure. Because the characteristic current is lower, the voltage level of the data line Data could rise slowly and thus the impact on the voltage level of the capacitor Cvcom is smaller. Thus, the voltage level of the common electrode may not shift. Accordingly, the driving system 10 of the display panel 13 could reduce the capacitor coupling effect of the common electrode and alleviate the horizontal crosstalk.

The timing controller 11 is connected to the system on chip (SOC) and receives the VBO information from the SOC. The receiver of the timing controller 11 analyzes the VBO signal based on a specific protocol to obtain corresponding image information, which is the video signal VD. Then, the timing controller 11 writes the video signal VD into the driving chip 12 in a specific order.

After the timing controller 11 analyzes the video signal VD, the timing controller 11 identifies the video signal VD to determine whether the video signal VD is a characteristic video signal SVD or a regular video signal NVD and then output the characteristic video signal SVD or the regular video signal NVD to the driving chip 12. Accordingly, the video signal VD received by the driving chip 12 had been identified as the characteristic video signal SVD or the regular video signal NVD. The driving chip 12 only needs to process the received video signal VD and then output the processed video signal to the display panel 13.

The display panel 13 could be a liquid crystal display (LCD) panel. The present disclosure does not limit the type of the LCD panel. It can be a twisted nematic (TN) type of LCD panel, a multi-domain vertical alignment (MVA) LCD panel, a horizontal electric field type of LCD panel, a fringe filed switching (FFS) type of LCD panel, or an in-plane-switching type of LCD panel.

The driving chip 12 could be one chip or more chips. In the actual implementation, the driving chip 12 could be arranged according to the size and the resolution of the display panel 13.

Please refer to FIG. 2. The driving chip 12 comprises a data processing module 121, a selecting module 122 and a current driving module 123. The data processing module 121 is configured to receive the video signal VD and process the video signal VD to output a corresponding analog signal AL. The selecting module 122 is configured to receive the video signal VD and output a selection result according to the video signal VD. The current driving module 123 is configured to receive the analog signal AL and process the analog signal AL according to the selection result to output the characteristic current SI or the regular current NI to the display panel 13.

In this embodiment, the video signal VD received by the data processing module 121 has been identified as the characteristic video signal SVD or the regular video signal NVD. Accordingly, the data processing module 121 only needs to process the video signal VD, transform the video signal VD into the analog signal VL and then transfer the analog signal VL to the current driving module 123. Therefore, the driving system 10 has a simple structure and occupies a smaller layout area. In addition, the data processing module 121 could be used to transform other signals and could be used as another module for signal transformation.

The data processing module 121 comprises a register 1211, a latch 1212, a level shifter 1213, and a digital-to-analog converter (DAC) 1214. The register 1211 is configured to receive the video signal VD and temporarily store the video signal VD. The latch 1212 is configured to receive the video signal VD temporarily stored in the register 1211 and latch the video signal VD. The level shifter 1213 is configured to receive the video signal VD latched by the latch 1212 and process the video signal VD to transform the video signal VD into a digital signal DG and outputs the digital signal DG to the DAC 1214. The DAC 1214 is configured to receive the digital signal DG to output an analog signal AL.

The video signal VD analyzed by the timing controller 11 is written into the register 1211 in a specific order. The video signal VD received by the register 1211 triggers the register 1211 according to the rising edges of the clock to shift data stored in the register 1211 from its left to its right. After the shift operation is completed, a synchronization signal (now shown) is inputted such that the register 1211 outputs the data stored in the register 1211 to the latch 121. The latch 1212 latches the data. Then, the level shifter 1213 transforms the latch signal LT stored in the latch 1212 into the digital signal DG and output the digital signal DG to the DAC 1214. The DAC 1214 transforms the digital signal DG into the analog signal AL and outputs the analog signal AL to the current driving module 123. Here, the detailed operations and signal transmission mechanisms of the digital processing module 121 are well known and thus further illustration is omitted here.

The selecting module 122 comprises a control unit 1221 and a switch unit 1222. The switch unit 1222 comprises a first switch **1222*a* and a second switch 1222*b*. The control unit 1221 is configured to receive the characteristic video signal SVD and turn on the first switch 1222*a* according to the characteristic video signal to output a characteristic current selection result and to receive the regular video signal NVD and turn on the second switch 1222*b*** according to the regular video signal NVD to output a regular current selection result.

The current driving module 123 comprises a first current source 1231, a second current source 1232 and an amplifying unit 1233. The first switch **1222*a* is connected to the data processing module 121 and the first current source 1231. The second switch 1222*b* is connected to the data processing module 121 and the second current source 1232**.

The first current source 1231 is configured to receive the analog signal AL and process the analog signal AL to output the characteristic current SI according to the characteristic current selection result. The second current source 1232 is configured to receive the analog signal AL and process the analog signal AL to output the regular current NI according to the regular current selection result. The amplifying unit 1233 is configured to amplify the characteristic current SI and the regular current NI and output an amplified characteristic current SI and an amplified regular current NI to the display panel 13.

The current driving module 123 could output different driving currents by having different current sources having different driving capabilities. The driving capability of the first current source 1231 is smaller than the driving capability of the second current source 1232. After the control unit 1221 receives the characteristic video signal SVD, the control unit 1221 turns on the first switch **1222*a* according to the characteristic video signal SVD. The first current source 1231 receives the characteristic video signal SVD and processes the characteristic video signal SVD to output the characteristic current SI. Because the characteristic current SI outputted by the first current source 1231 is smaller, the data voltage of the display panel 13 is switched in a slower rate. Similarly, after the control unit 1221 receives the regular video signal NVD, the control unit 1221 turns on the second switch 1222*b* according to the regular video signal NVD. The second current source 1232 receives the regular video signal NVD and processes the regular video signal NVD to output the regular current NI. Because the characteristic current NI outputted by the second current source 1232 has a larger driving capability, the data voltage of the display panel 13** is switched in a faster rate and has a voltage jump.

In order to have a better driving performance, the driving system 10 could further comprise an amplifying unit 1223. The amplifying unit 1233 could enhance the driving capability of the driving system 10 of the display panel, reduce the power consumption and raise the driving efficiency.

The amplifying unit 1233 could be a driving buffer.

When the characteristic current SI is outputted to the display panel 13, the data voltage of the display panel could be switched within 100 ns-300 nm. When the regular current NI is outputted to the display panel 13, the data voltage of the display panel could be switched within 40 ns-60 ns.

When the characteristic current SI is outputted to the display panel 13, the data voltage of the display panel could be switched within 100 ns, 150 ns, 200 ns, 250 ns or 300 ns. When the regular current NI is outputted to the display panel 13, the data voltage of the display panel could be switched within 40 ns, 45 ns, 50 ns, 55 ns or 60 ns.

When the gray value difference between adjacent frames is greater, the characteristic current SI is outputted to the display panel 13 because it would be better to pull up the data voltage in a slower rate. At this time, the data voltage could be switched within 100 ns-300 nm. Here, if the switching time is shorter than 100 ns, the capacitor coupling effect may occur to affect the voltage level of the common electrode. If the switching time is longer than 300 ns, it may take too long for pulling up the data voltage and thus the display effect for switching frames may be ruined.

When the gray value difference between adjacent frames is smaller, the data voltage could be pulled up in a regular rate. Therefore, the regular current NI is outputted to the display panel 13. At this time, the data voltage could be switched within 40 ns-60 nm. Thus, it only needs a shorter time to pull up the data voltage and ensures the display effect for switching frames.

Please note, the characteristic video signal SVD is the video signal VD when the display screen switching gray value difference is larger than or equal to 32. Specifically, when the frame is switched from the gray value 32 to the gray value 64, from the gray value 64 to the gray value 128, from the gray value 64 to the gray value 255 or from the gray value 128 to the gray value 255, the outputted video signal VD is the characteristic video signal SVD. The above gray value differences are only examples. For some other gray value differences, the characteristic video signal SVD is outputted. These changes all fall within the scope of the present disclosure. For example, when the display panel 13 needs to display a white frame with a gray background, the gray value of the display panel changes from gray value 64 to the gray value 255. At this time, the characteristic video signal SVD is outputted to the display panel 13 such that the data voltage is pulled up within 100 ns-300 ns.

Furthermore, a selecting module 122 is added between the data processing module 121 and the current driving module 123. That is, a switch circuit is added between the DAC 1214 and the amplifying unit 1233. In this embodiment, the control unit 1221 receives the video signal VD and controls the on/off state of the switch unit 1222 according to the video signal VD. When the screen switching gray value difference of the display panel 13 is greater, the first switch **1222*a* is turned on to output the characteristic current SI to the display panel 13 for switching the data voltage in a slower rate. When the screen switching gray value difference of the display panel 13 is smaller, the second switch 1222*b* is turned on to output the regular current NI to the display panel 13** for switching the data voltage in a regular rate. That is, the present disclosure drives the display panel in a different way when there is a huge possibility for the display panel to have the crosstalk. In this way, the crosstalk issue could be alleviated.

In addition, the driving system 10 merely includes one selecting module 122 to use two different current sources having different driving capabilities. There is no need to have a huge change of design for the display chip 12. This could reduce the design difficulties. Furthermore, the present disclosure directly adds a control unit 1221 to receive the video signal VD to control the switch unit 1222. This control method is simple and there is no need to add other signal transmission lines or other processing on the video signal.

Figure 4:
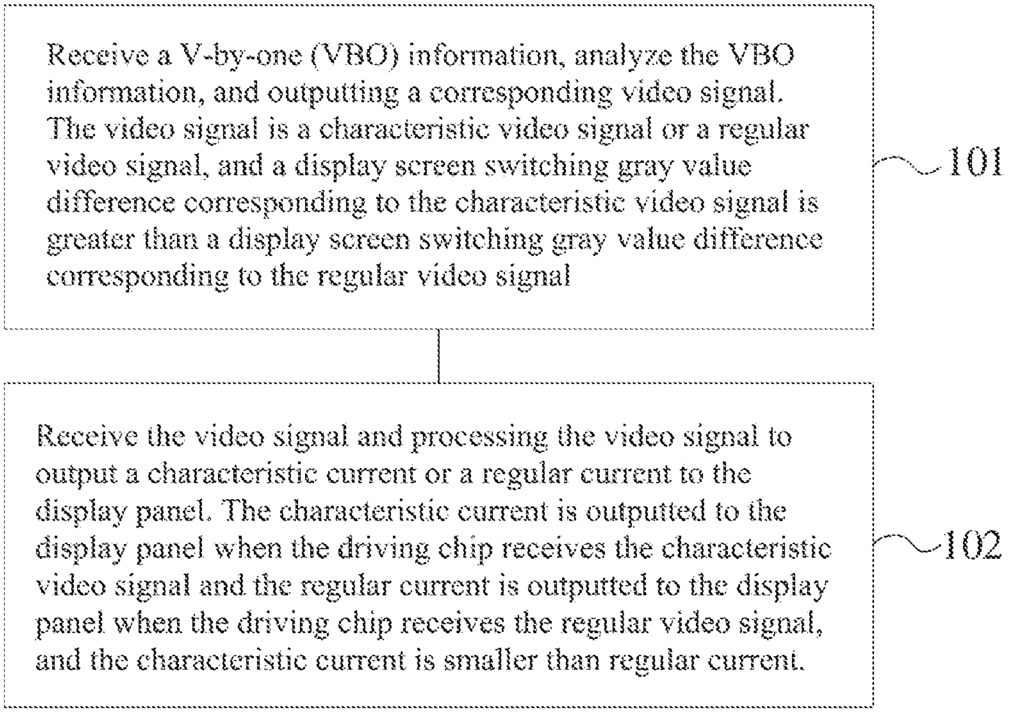
FIG. 4 is a flow chart of a display method of a display panel according to an embodiment of the present disclosure.

Please refer to FIG. 4. FIG. 4 is a flow chart of a display method of a display panel according to an embodiment of the present disclosure. The display method comprises:

Step 101: receiving a V-by-one (VBO) information, analyzing the VBO information, and outputting a corresponding video signal; wherein the video signal is a characteristic video signal or a regular video signal, and a display screen switching gray value difference corresponding to the characteristic video signal is greater than a display screen switching gray value difference corresponding to the regular video signal.

In this embodiment, the timing controller is connected to the SOC of the display panel 13 and is used to receive the VBO information from the SOC. The receiver of the timing controller analyzes the received VBO information according to a specific protocol to obtain corresponding image information, which is the video signal VD. Then, the timing controller 11 writes the video signal VD into the driving chip 12 in a specific order.

When the timing controller analyzes the video signal, the timing controller determines whether the display screen switching gray value difference corresponding to the video signal is greater than or equal to the gray value 32. When the display screen is in a transition of frames, if the gray value difference between the adjacent frames is greater than or equal to 32, the voltage level of the data lines enormously changes. This means that the data voltage needs to have a huge voltage jump for switching the frames. At this time, the driving current for controlling the data lines charges the capacitor between the data line and the common electrode. The voltage jump introduces the capacitor coupling effect, changes the voltage level of the common electrode and causes horizontal crosstalk in the display screen. Therefore, when the timing controller determines that the display screen switching gray value difference corresponding to the video signal is greater than or equal to 32, the timing controller outputs the characteristic video signal. When the timing controller determines that the display screen switching gray value difference corresponding to the video signal is smaller than 32, the timing controller outputs the regular video signal.

Step 102: receiving the video signal and processing the video signal to output a characteristic current or a regular current to the display panel; wherein the characteristic current is outputted to the display panel when the driving chip receives the characteristic video signal and the regular current is outputted to the display panel when the driving chip receives the regular video signal, and the characteristic current is smaller than regular current.

Figure 5:
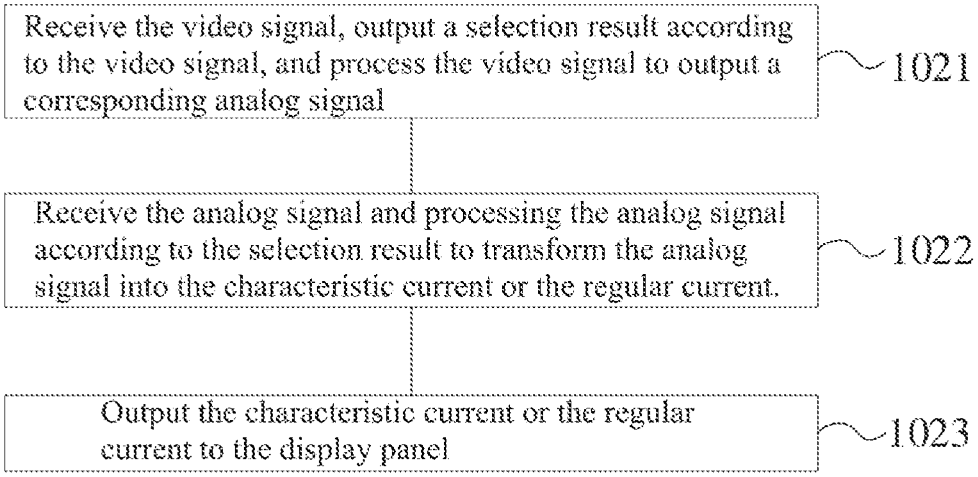
FIG. 5 is a sub flow chart of a display method of a display panel according to an embodiment of the present disclosure.

Please refer to FIG. 5. FIG. 5 is a sub flow chart of a display method of a display panel according to an embodiment of the present disclosure. As shown in FIG. 5, Step 102 comprises:

Step 1021: receiving the video signal, outputting a selection result according to the video signal, and processing the video signal to output a corresponding analog signal.

The control unit receives the video signal and controls the first switch according to the video signal to output the characteristic current selection result. Or, the control unit receives the video signal and controls the second switch according to the video signal to output the regular current selection result.

The data processing module processes the video signal to transforms the video signal into a corresponding analog signal. Specifically, the video signal analyzed by the timing controller is written into the register in a specific order. The video signal received by the register triggers the register according to the rising edges of the clock to shift data stored in the register from its left to its right. After the shift operation is completed, a synchronization signal (now shown) is inputted such that the register outputs the data stored in the register to the latch. The latch latches the data. Then, the level shifter transforms the latch signal stored in the latch into the digital signal and output the digital signal to the DAC. The DAC transforms the digital signal into the analog signal and outputs the analog signal to the current driving module.

Step 1022: receiving the analog signal and processing the analog signal according to the selection result to transform the analog signal into the characteristic current or the regular current.

The current driving module receives the analog signal and processes the analog signal according to the selection result to transform the analog signal into the characteristic current or the regular current.

The control unit in the current driving module outputs the characteristic current selection result and to turn on the first switch accordingly. The first switch is connected to the data processing module and the first current source. Or, the control unit in the current driving module outputs the regular current selection result and to turn on the second switch accordingly. The second switch is connected to the data processing module and the second current source. The first current source receives the analog signal and transforms the analog signal into the characteristic current according to the characteristic current selection result. Because the driving capability of the first current source is smaller than the driving capability of the second current source, the characteristic current outputted by the first current source is smaller than the regular current outputted by the second current source.

Step 1023: outputting the characteristic current or the regular current to the display panel.

When the characteristic current is outputted to the display panel, the display panel could switch the data voltage in a slower rate. When the regular current is outputted to the display panel, the display panel could switch the data voltage in a faster rate.

When the gray value difference between adjacent screens is greater, the characteristic current is outputted to the display panel because it would be better to pull up the data voltage in a slower rate. At this time, the data voltage could be switched within 100 ns-300 nm. Here, if the switching time is shorter than 100 ns, the capacitor coupling effect may occur to affect the voltage level of the common electrode. If the switching time is longer than 300 ns, it may take too long for pulling up the data voltage and thus the display effect for switching frames may be ruined.

When the gray value difference between adjacent screens is smaller, the data voltage could be pulled up in a regular rate. Therefore, the regular current is outputted to the display panel. At this time, the data voltage could be switched within 40 ns-60 nm. Thus, it only needs a shorter time to pull up the data voltage and ensures the display effect for switching frames.

Before the characteristic current or the regular current is outputted to the display panel, the characteristic current or the regular current is amplified. In order to better drive the display panel, the amplifying unit could be used to amplify characteristic current or the regular current and then the amplified characteristic current or the amplified regular current is outputted to the display panel. The amplifying unit could increase the driving capability of the driving system of the display panel. In this way, the power consumption is reduced and the driving efficiency is raised.

Step 1021 could comprise: receiving the characteristic video signal, outputting the characteristic current selection result according to the characteristic video signal, and processing the characteristic video signal to output the corresponding analog signal; or receiving the regular video signal, outputting the regular current selection result according to the characteristic video signal, and processing the regular video signal to output the corresponding analog signal.

When the control unit receives the characteristic video signal, the control unit turns on the first switch. At this time, the second switch is still turned off. The analog signal outputted from the data processing module is transferred through the first switch and thus transferred to the first current source. When the control unit receives the regular video signal, the control unit turns on the second switch. At this time, the first switch is still turned off. The analog signal outputted from the data processing module is transferred through the second switch and thus transferred to the second current source. Because the first current source and the second current source have different capabilities, the current value of the characteristic current outputted by the first current source is smaller than the current value of the regular current outputted by the second current source.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A driving system of a display panel, the driving system comprising:

a timing controller, connected to the display panel, configured to receive a V-by-one (VBO) information, analyze the VBO information, and output a corresponding video signal; wherein the video signal is a characteristic video signal or a regular video signal, and a display screen switching gray value difference corresponding to the characteristic video signal is greater than a display screen switching gray value difference corresponding to the regular video signal; and a driving chip, connected to the timing controller and the display panel, configured to receive the video signal and process the video signal to output a characteristic current or a regular current to the display panel; wherein the driving chip is configured to output the characteristic current to the display panel when the driving chip receives the characteristic video signal and to output the regular current to the display panel when the driving chip receives the regular video signal, and the characteristic current is smaller than regular current.

2. The driving system of claim 1, wherein the driving chip comprises:

a data processing module, configured to receive the video signal and process the video signal to output a corresponding analog signal;

a selecting module, configured to output a selection result according to the video signal; and a current driving module, configured to receive the analog signal and process the analog signal according to the selection result to output the characteristic current or the regular current to the display panel.

3. The driving system of claim 2, wherein the data processing module comprises:

a register, configured to receive the video signal and temporarily store the video signal;

a latch, configured to receive the video signal temporarily stored in the register and latch the video signal;

a level shifter, configured to receive the video signal latched by the latch and process the video signal to output a digital signal; and a digital-to-analog converter, configured to receive the digital signal to output an analog signal.

4. The driving system of claim 2, wherein the selecting module comprises:

a switch unit, comprising a first switch and a second switch; and a control unit, configured to turn on the first switch according to the characteristic video signal to output a characteristic current selection result and to turn on the second switch according to the regular video signal to output a regular current selection result.

5. The driving system of claim 4, wherein the current driving module comprises:

a first current source, configured to receive the analog signal and process the analog signal to output the characteristic current according to the characteristic current selection result;

a second current source, configured to receive the analog signal and process the analog signal to output the regular current according to the regular current selection result; and an amplifying unit, configured to amplify the characteristic current and the regular current and output an amplified characteristic current and an amplified regular current to the display panel;

wherein the first switch is connected to the data processing module and the first current source and the second switch is connected to the data processing module and the second current source.

6. The driving system of claim 5, wherein a driving capability of the first current source is smaller than a driving capability of the second current source.

7. The driving system of claim 1 wherein when the characteristic current is outputted to the display panel, the data voltage of the display panel is switched within 100 ns-300 ns.

8. The driving system of claim 1 wherein when the regular current is outputted to the display panel, the data voltage of the display panel is switched within 40 ns-60 ns.

9. The driving system of claim 1, wherein the characteristic video signal is a video signal outputted in a transition of an $N^{th}$ frame and an $(N+1)^{th}$ frame when a gray value difference between the $N^{th}$ frame and the $(N+1)^{th}$ frame is greater than or equal to 32, and N is an integer greater than or equal to 1.

10. The driving system of claim 9, wherein the characteristic video signal is a video signal outputted in the transition of the $N^{th}$ frame and the $(N+1)^{th}$ frame when the $N^{th}$ frame has a gray value of 32 and the $(N+1)^{th}$ frame has a gray value of 64.

11. The driving system of claim 9, wherein the characteristic video signal is a video signal outputted in the transition of the $N^{th}$ frame and the $(N+1)^{th}$ frame when the $N^{th}$ frame has a gray value of 64 and the $(N+1)^{th}$ frame has a gray value of 128.

12. The driving system of claim 9, wherein the characteristic video signal is a video signal outputted in the transition of the $N^{th}$ frame and the $(N+1)^{th}$ frame when the $N^{th}$ frame has a gray value of 64 and the $(N+1)^{th}$ frame has a gray value of 255.

13. The driving system of claim 9, wherein the characteristic video signal is a video signal outputted in the transition of the $N^{th}$ frame and the (N+1)th frame when the $N^{th}$ frame has a gray value of 128 and the $(N+1)^{th}$ frame has a gray value of 255.

14. The driving system of claim 1, wherein the timing controller is further configured to determine whether the display screen switching gray value difference is greater than or equal to 32.

15. A driving method of a display panel, the driving method comprising:

receiving a V-by-one (VBO) information, analyzing the VBO information, and outputting a corresponding video signal; wherein the video signal is a characteristic video signal or a regular video signal, and a display screen switching gray value difference corresponding to the characteristic video signal is greater than a display screen switching gray value difference corresponding to the regular video signal; and receiving the video signal and processing the video signal to output a characteristic current or a regular current to the display panel; wherein the characteristic current is outputted to the display panel when the driving chip receives the characteristic video signal and the regular current is outputted to the display panel when the driving chip receives the regular video signal, and the characteristic current is smaller than regular current.

16. The driving method of claim 15, wherein the step of receiving the V-by-one VBO information, analyzing the VBO information, and outputting the corresponding video signal comprises:

determining whether the display screen switching gray value difference is greater than or equal to 32; and outputting the characteristic video signal on the condition that the display screen switching gray value difference is greater than or equal to 32; and outputting the regular video signal on the condition that the display screen switching gray value difference is smaller than 32.

17. The driving method of claim 15, wherein the step of receiving the video signal and processing the video signal to output a characteristic current or a regular current to the display panel comprises:

receiving the video signal, outputting a selection result according to the video signal, and processing the video signal to output a corresponding analog signal;

receiving the analog signal and processing the analog signal according to the selection result to output the characteristic current or the regular current.

18. The driving method of claim 17, further comprising a following step before the step of outputting the characteristic current or the regular current:

amplifying the characteristic current or the regular current.

19. The driving method of claim 17, wherein the step of receiving the video signal, outputting a selection result according to the video signal, and processing the video signal to output the corresponding analog signal comprises:

receiving the characteristic video signal, outputting the characteristic current selection result according to the regular video signal, and processing the characteristic video signal to output the corresponding analog signal; or receiving the regular video signal, outputting the regular current selection result according to the characteristic video signal, and processing the regular video signal to output the corresponding analog signal.

* * * * *